(12) United States Patent
Nakajima et al.

(10) Patent No.: US 9,194,346 B2
(45) Date of Patent: Nov. 24, 2015

(54) ELECTROMAGNETIC FUEL INJECTION VALVE

(75) Inventors: Yoichi Nakajima, Kakuda (JP); Kenichi Saito, Kakuda (JP); Kazuhiko Sato, Kakuda (JP)

(73) Assignee: Keihin Corporation, Tokyo (JP)

(*) Notice: Subject to any disclaimer, the term of this patent is extended or adjusted under 35 U.S.C. 154(b) by 977 days.

(21) Appl. No.: 13/384,652

(22) PCT Filed: May 21, 2010

(86) PCT No.: PCT/JP2010/058606
§ 371 (c)(1),
(2), (4) Date: Mar. 9, 2012

(87) PCT Pub. No.: WO2011/010502
PCT Pub. Date: Jan. 27, 2011

(65) Prior Publication Data
US 2012/0153052 A1 Jun. 21, 2012

(30) Foreign Application Priority Data
Jul. 23, 2009 (JP) .................................. 2009-172277

(51) Int. Cl.
*F02M 63/00* (2006.01)
*F02M 51/06* (2006.01)
(Continued)

(52) U.S. Cl.
CPC .......... *F02M 51/0675* (2013.01); *B23K 33/006* (2013.01); *F02M 61/168* (2013.01); *F02M 2200/8084* (2013.01)

(58) Field of Classification Search
CPC ............ F02M 51/0675; F02M 61/168; F02M 2200/8084
USPC ................... 239/533.1–533.14, 585.1–585.5; 251/129.1–129.22
See application file for complete search history.

(56) References Cited

U.S. PATENT DOCUMENTS 5,178,362 A * 1/1993 Vogt et al. ................. 251/129.21
6,201,461 B1 3/2001 Eichendorf et al.
(Continued)

FOREIGN PATENT DOCUMENTS

CN 1768201 A 5/2006
JP 10-339240 A 12/1998
(Continued)

*Primary Examiner* — Arthur O Hall
*Assistant Examiner* — Viet Le
(74) *Attorney, Agent, or Firm* — Carrier Blackman & Associates, P.C.; Joseph P. Carrier; William D. Blackman

(57) ABSTRACT

In an electromagnetic fuel injection valve including a magnetic coil housing (31) having a coil assembly (28) housed therein, the coil housing (31) includes the first and second coil housing half bodies (31a, 31b) whose cross sections are each shaped like an inferior arc, and which are oppositely disposed so as to interpose the coil assembly (28) and a coupler (34), each of the coil housing half bodies (31a, 31b) includes: a barrel portion (44) for covering an outer peripheral surface of the coil assembly (28); a front-end wall portion (45) and a rear-end wall portion (46) which are in contact with front-end and rear-end surfaces of the coil assembly (28); a front connection cylindrical portion (47) welded to the outer peripheral surface of the magnetic cylindrical body (4); and a rear connection cylindrical portion (48) welded to the outer peripheral surface of the fixed core (5); both the coil housing half bodies are formed symmetrically; and one half part and the other half part of each of the coil housing half bodies (31a, 31b) in an axial direction are formed symmetrically. Thus, it is possible to provide an electromagnetic fuel injection valve which enables the coil housing to be formed from two identical components, and is inexpensive and good in assembling efficiency, as well as has a better magnetic efficiency.

6 Claims, 6 Drawing Sheets

(51) Int. Cl.
  *B23K 33/00* (2006.01)
  *F02M 61/16* (2006.01)

(56) References Cited

U.S. PATENT DOCUMENTS

| | | | |
|---|---|---|---|
| 6,341,759 | B1 | 1/2002 | Noller et al. |
| 6,796,511 | B2 | 9/2004 | Hohl |
| 2002/0139873 | A1* | 10/2002 | Ito et al. ............ 239/585.1 |
| 2006/0273274 | A1 | 12/2006 | Nagaoka |

FOREIGN PATENT DOCUMENTS

| | | |
|---|---|---|
| JP | 2001-525905 A | 12/2001 |
| JP | 2002-285938 A | 10/2002 |
| JP | 2002-533633 A | 10/2002 |
| JP | 2002285938 A * | 10/2002 |
| JP | 2003-521635 A | 7/2003 |
| JP | 2005-282458 A | 10/2005 |
| JP | 2008-223536 A | 9/2008 |

* cited by examiner

LASER WELDING POINT

ELECTROMAGNETIC FUEL INJECTION VALVE

TECHNICAL FIELD

The present invention relates to an electromagnetic fuel injection valve that is mainly used in a fuel supply system of an internal combustion engine and, in particular, to an improvement of an electromagnetic fuel injection valve that includes a valve housing including a valve seat member having a valve hole in its front end, a magnetic cylindrical body, a non-magnetic cylindrical body, a fixed core and a fuel intake cylinder which are sequentially connected from a front end toward a rear end thereof, an inside of the valve housing serving as a fuel passage; a coil assembly placed from the fixed core to the non-magnetic cylindrical body on outer peripheries thereof; a coil housing whose opposite end parts are connected to outer peripheral surfaces, respectively, of the fixed core and the magnetic cylindrical body with the coil assembly housed in the coil housing, the coil housing forming a magnetic circuit between the fixed core and the magnetic cylindrical body when the coil assembly is electrified; a valve body for opening and closing the valve hole in cooperation with the valve seat member; a movable core which is connected to the valve body, slidably fitted to an inner peripheral surface of the magnetic cylindrical body, and opens the valve body due to its attraction to the fixed core when the magnetic circuit is formed; and a coupler connected to the coil assembly, and projecting outward of the coil housing.

BACKGROUND ART

The followings have been already known as this type of electromagnetic fuel injection valve. In one electromagnetic fuel injection valve (see Patent Document 1 listed below), a coil housing includes: a bottomed cylinder-shaped housing main body having a connection portion, which is welded to an outer peripheral surface of a magnetic cylindrical body, in its front end, and housing a coil assembly; and a yoke plate fitted to the inner peripheral surface of the rear-end part of the housing main body and welded to the outer peripheral surface of the fixed core. In the other electromagnetic fuel injection valve (see Patent Document 2 listed below), the coil housing is divided into semi-cylinder-shaped first and second coil housing half bodies between which the coupler, the coil assembly and the coupler are interposed.

PRIOR ART DOCUMENTS

Patent Documents

Patent Document 1: Japanese Patent Application Laid-open No. 2008-223536
Patent Document 2: Japanese Patent Application Laid-open No. 2002-285938

SUMMARY OF THE INVENTION

Problems to be Solved by the Invention

With the former coil housing, the press-forming of the bottomed cylinder-shaped housing main body needs troublesome deep drawing, and requires the yoke plate to be produced separately, as well as accordingly makes cost reduction difficult. With the latter coil housing, although the first and second coil housing half bodies can be relatively easily press-formed without deep drawing because the coil housing is divided into the first and second coil housing half bodies in the diametrical direction, the first and second coil housing half bodies are not interchangeable because of their structure for interposing the coupler between themselves, and accordingly makes cost reduction difficult. Furthermore, neither the former coil housing nor the latter coil housing is good in assembling efficiency because the assembling places restriction on the assembly orientation for assembling the components.

The present invention has been made with the foregoing situations taken into consideration. An object of the present invention is to provide an electromagnetic fuel injection valve which enables the coil housing to be formed from two identical components, and is inexpensive and good in assembling efficiency, as well as has a better magnetic efficiency.

Means for Solving the Problems

In order to attain the above object, according to a first aspect of the present invention, there is provided an electromagnetic fuel injection valve including: a valve housing including a valve seat member with a valve hole in its front end, a magnetic cylindrical body, a non-magnetic cylindrical body, a fixed core and a fuel intake cylinder which are sequentially connected from a front end toward a rear end thereof, an inside of the valve housing serving as a fuel passage; a coil assembly placed from the fixed core to the non-magnetic cylindrical body on outer peripheries thereof; a coil housing whose opposite end parts are connected to outer peripheral surfaces, respectively, of the fixed core and the magnetic cylindrical body with the coil assembly housed in the coil housing, the coil housing forming a magnetic circuit between the fixed core and the magnetic cylindrical body when the coil assembly is electrified; a valve body for opening and closing the valve hole in cooperation with the valve seat member; a movable core which is connected to the valve body, slidably fitted to an inner peripheral surface of the magnetic cylindrical body, and opens the valve body due to its attraction to the fixed core when the magnetic circuit is formed; and a coupler connected to the coil assembly, and projecting outward of the coil housing, characterized in that the coil housing includes first and second coil housing half bodies whose cross sections are each shaped like an inferior arc, and which are oppositely disposed so as to interpose the coil assembly and the coupler, each of the coil housing half bodies includes: a barrel portion for covering an outer peripheral surface of the coil assembly; a front-end wall portion and a rear-end wall portion which are bent inward in a radial direction from opposite ends of the barrel portion, and are in contact with front-end and rear-end surfaces of the coil assembly; a front connection cylindrical portion extending frontward from an inner end of the front-end wall portion, and fixedly attached to the outer peripheral surface of the magnetic cylindrical body; and a rear connection cylindrical portion extending rearward from an inner end of the rear-end wall portion, and fixedly attached to the outer peripheral surface of the fixed core, and the first and second coil housing half bodies are formed symmetrically and outer diameters of the magnetic cylindrical body and the fixed core are set equal to each other, so that one half and the other half part of each of the coil housing half bodies in an axial direction are formed symmetrically.

Further, according to a second aspect of the present invention, in addition to the first aspect, the coil housing half bodies are made by pressing, and the magnetic circuit part between the front connection cylindrical portion and the rear connection cylindrical portion is formed with the same thickness.

Furthermore, according to a third aspect of the present invention, in addition to the first or second aspect, a radius of an inner peripheral surface of the front and rear connection cylindrical portions of each of the coil housing half bodies is set less than a radius of each of the outer peripheral surfaces of the magnetic cylindrical body and the fixed core, so that opposite end parts of each of the connection cylindrical portions in a circumferential direction are put in intimate contact with the outer peripheral surfaces of the magnetic cylindrical body and the fixed core, and parts of the front connection cylindrical portion and the magnetic cylindrical body which are in intimate contact with each other are placed opposite to a part of the magnetic cylindrical body which slidably supports the movable core.

Moreover, according to a fourth aspect of the present invention, in addition to the first aspect, thin portions whose thicknesses are less than those of the remaining portions of the coil housing half bodies are formed in outer ends of the front connection cylindrical portion and the rear connection cylindrical portion, respectively, the thin portion of the front connection cylindrical portion is laser-welded to a part of the outer peripheral surface of the magnetic cylindrical body, the part deviating forward from a part of the magnetic cylindrical body which slidably supports the movable core, and the thin portion of the rear connection cylindrical portion is laser-welded to the outer peripheral surface of the fixed core.

Further, according to a fifth aspect of the present invention, in addition to any one of the first to fourth aspects, between the first and second coil housing half bodies, a space is provided on a side where a bottom of the coupler is interposed, and a space is also provided on a side opposite thereto, and a covering layer, made of synthetic resin, which the coil assembly and the bottom of the coupler are embedded in and sealed by, is molded around an outer periphery of the valve housing. It should be noted here that the above-mentioned covering layer corresponds to a second covering layer 32 of an embodiment of the present invention, which will be described later.

Effects of the Invention

In accordance with the first aspect of the present invention, it is possible to easily process each coil housing half body without deep drawing, because the coil housing includes the first and second coil housing half bodies whose cross sections are each shaped like an inferior arc, and which are placed opposite to each other with the coil assembly and the coupler interposed in between.

In addition, because the first and second coil housing half bodies are formed symmetrically while the front and rear half parts of each coil housing half body are formed symmetrically, not only it is possible to form the two coil housing half bodies from the identical components, thereby contributing to cost reduction, but also it is possible to replace the positions of the coil housing half bodies in the fore-and-aft direction. Therefore, it is possible to place the two identical coil housing half bodies in their appropriate positions and to connect them to the valve housing by the simple placement of the two identical coil housing half bodies opposite to each other without considering the fore-and-aft directions of the identical coil housing half bodies, thereby clearing worry of the false assembly. Furthermore, concurrently, it is possible to hold the coil assembly in a predetermined location in the axial direction by making the opposite ends of the coil assembly held by the front-end and rear-end wall portions of each coil housing half body.

In accordance with the second aspect of the present invention, it is possible to satisfy both the weight reduction requirement and magnetic efficiency requirement of the coil housing half bodies.

In accordance with the third aspect of the present invention, it is possible to minimize the magnetic resistance between the movable core and each front connection cylindrical portion.

In accordance with the fourth aspect of the present invention, the coil housing half bodies can be laser-welded to the valve housing with a relatively small amount of heat input by laser-welding the thin portions of the respective front and rear connection cylindrical portions to the valve housing. Furthermore, it is possible to prevent the part of the magnetic cylindrical body, which movably supports the movable core, from thermally deforming due to the laser-welding, and accordingly to secure the smooth operation of the movable core.

In accordance with the fifth aspect of the present invention, when the covering layer is molded so as to embed and seal the coil assembly, the coil housing and the bottom of the coupler, the injected resin can easily enter the interstice between each coil housing half bodies and the coil assembly via the space near the coupler and the space on the opposite side which are provided between the first and second coil housing half bodies, and the coil assembly can securely be embedded in, sealed by and fixed to the resin. In addition, it is possible to secure the insulation quality and waterproofness of the coil assembly.

EXPLANATION OF REFERENCE NUMERALS AND SYMBOLS

Figure 1:
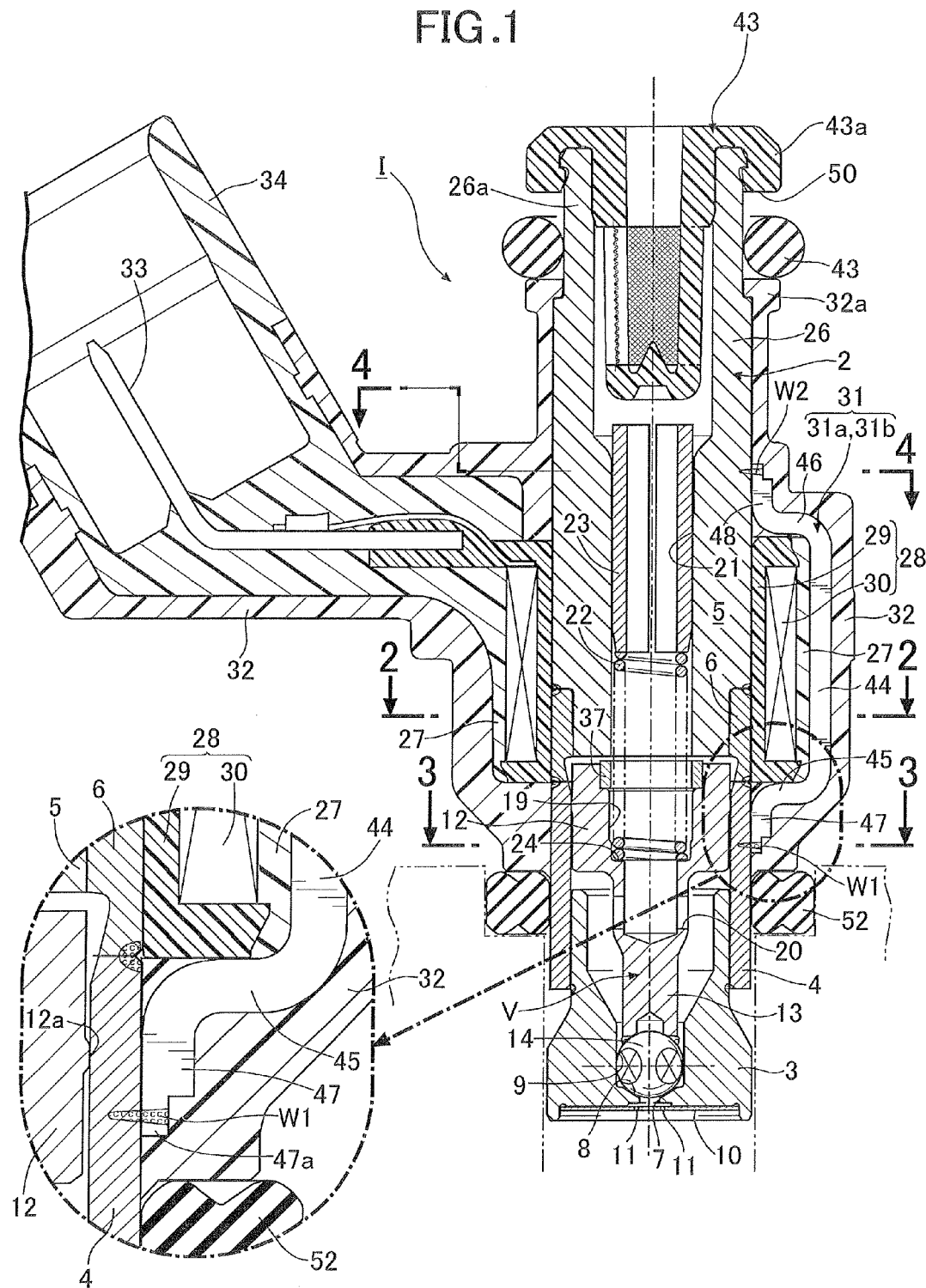
FIG. 1 is a longitudinal sectional view of an electromagnetic fuel injection valve related to an embodiment of the present invention. (first embodiment)
Figure 2:
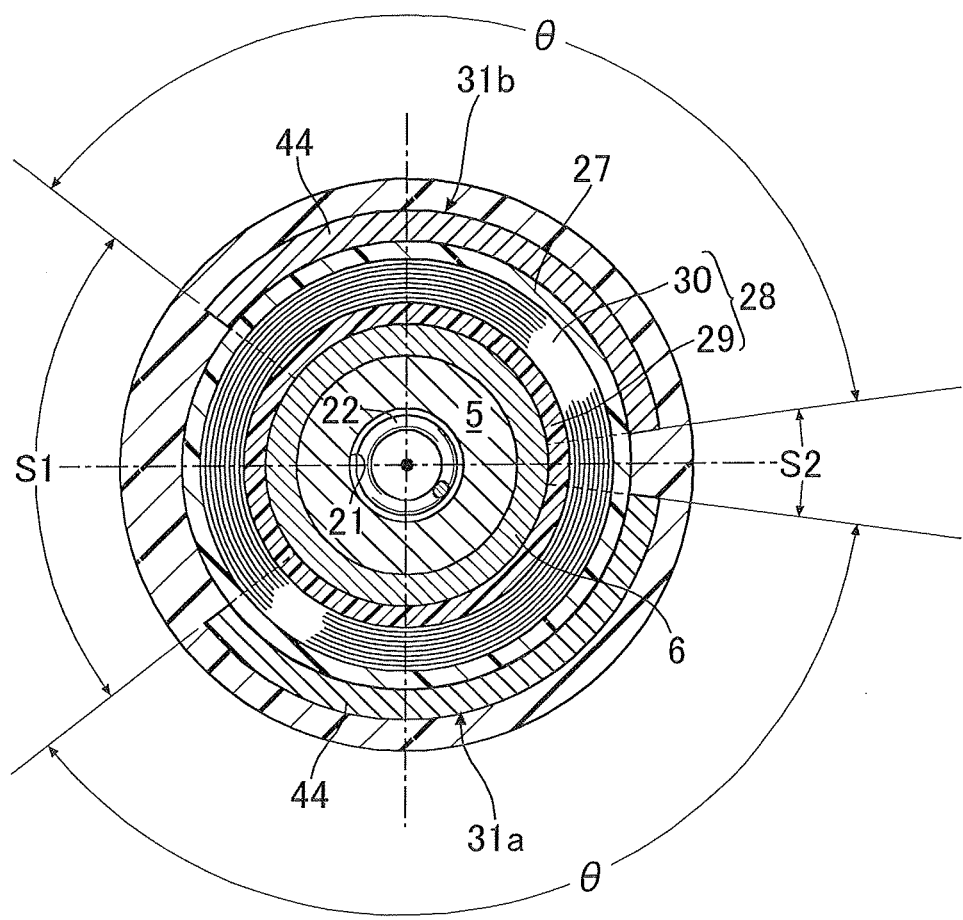
FIG. 2 is a sectional view along line 2-2 in FIG. 1. (first embodiment)
Figure 3:
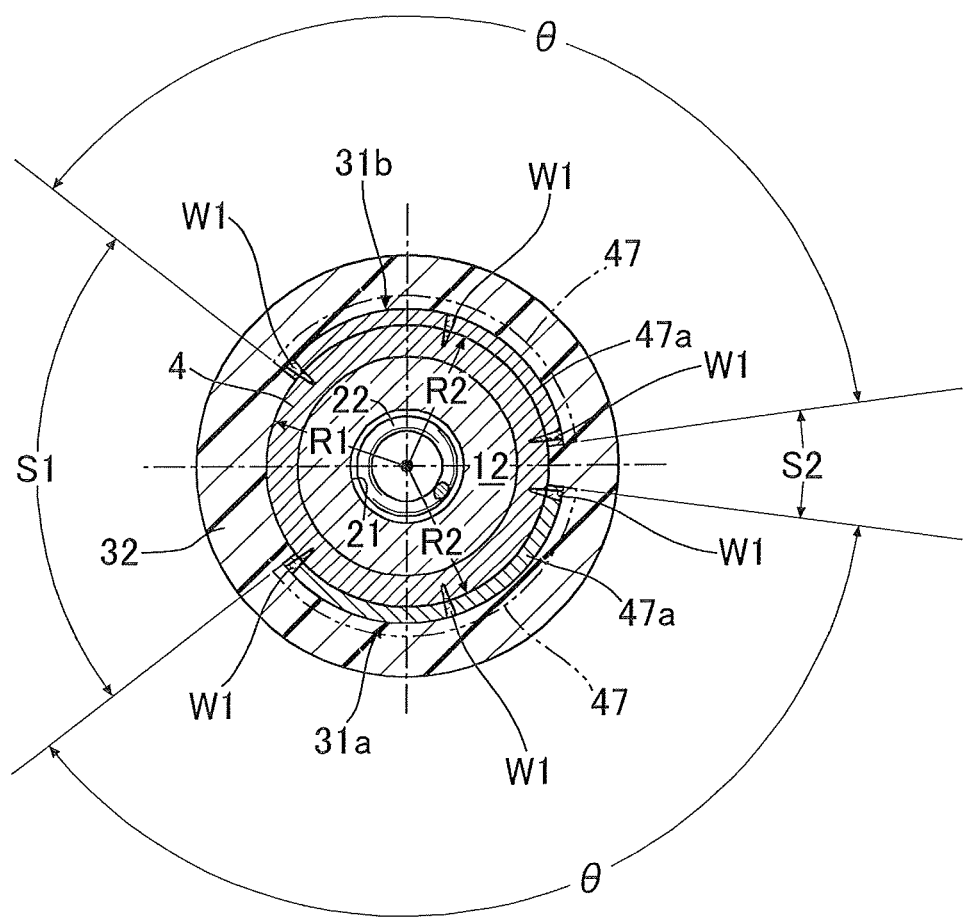
FIG. 3 is a sectional view along line 3-3 in FIG. 1. (first embodiment)
Figure 4:
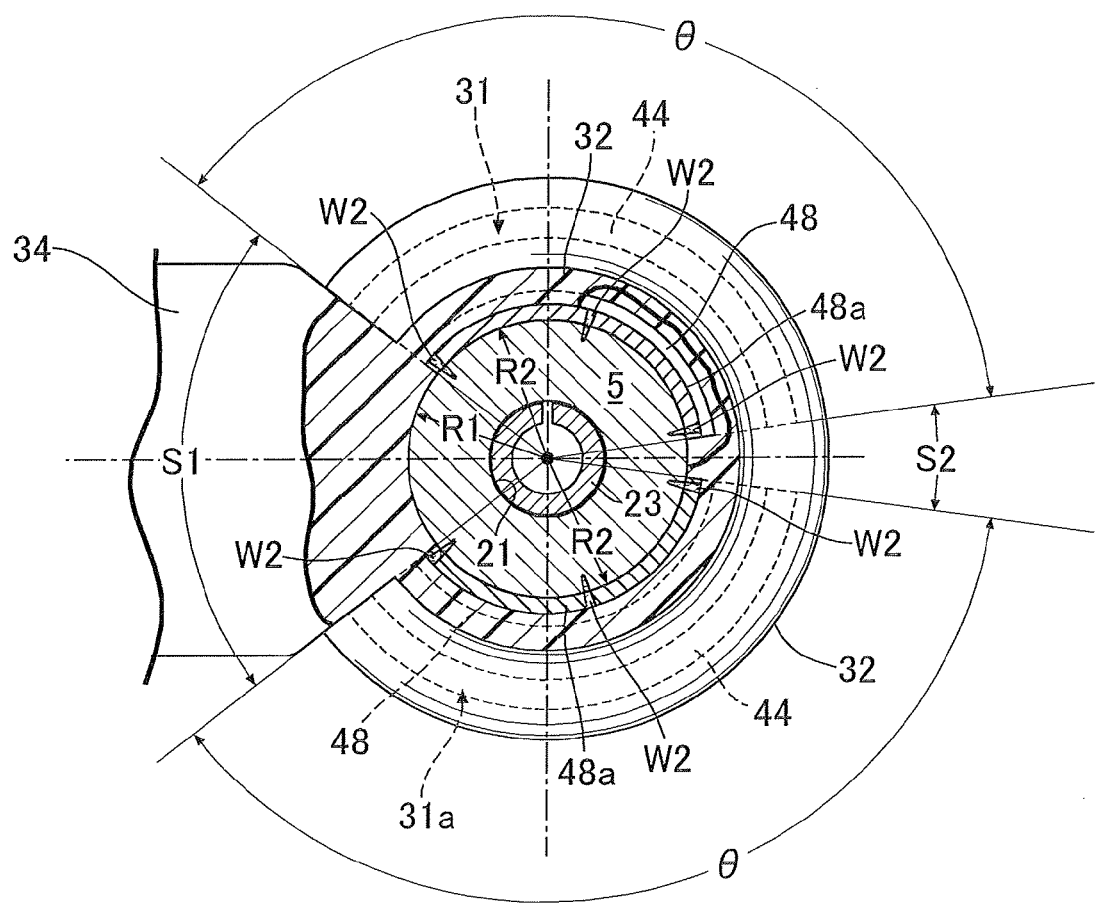
FIG. 4 is a sectional view along line 4-4 in FIG. 1. (first embodiment)
Figure 5:
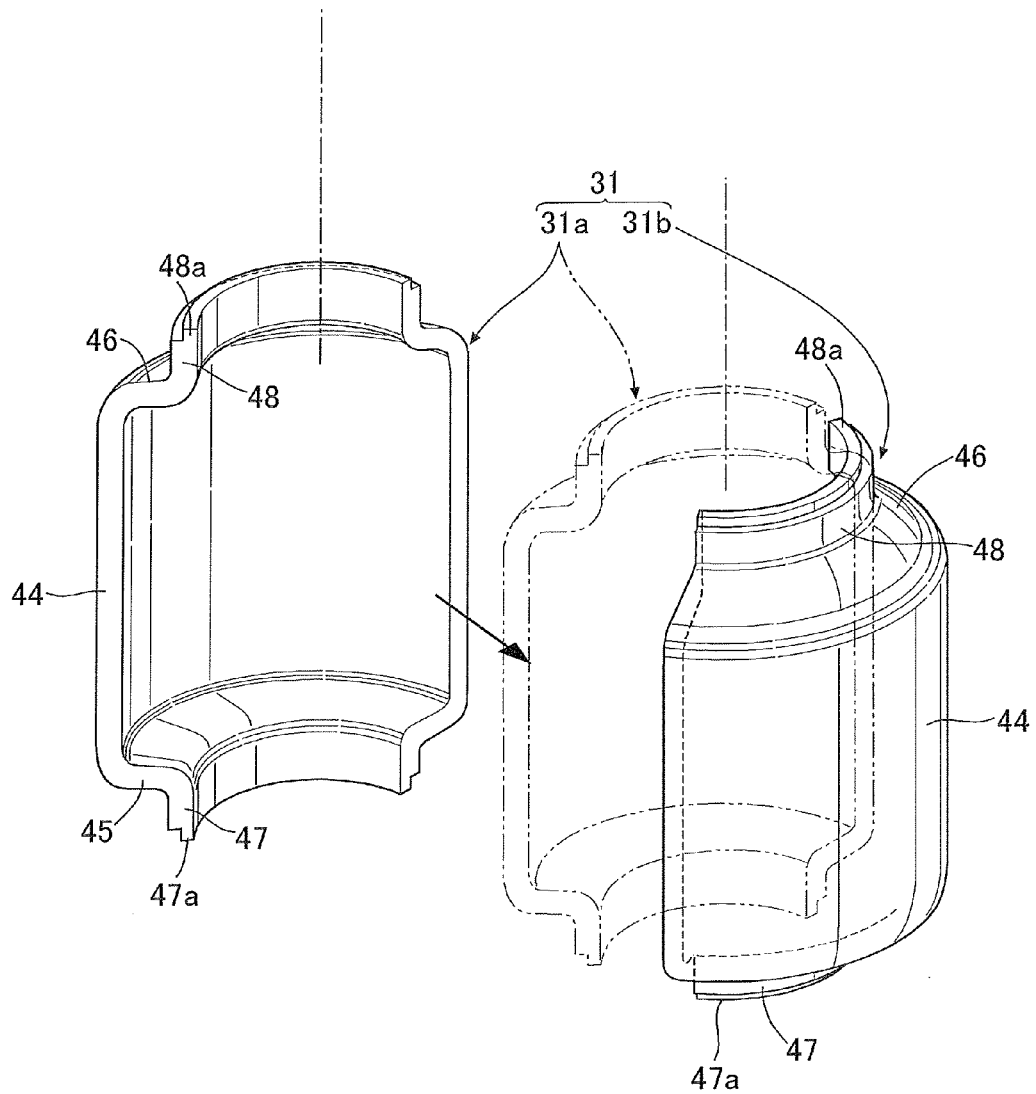
FIG. 5 is an exploded perspective view of a coil housing of the same electromagnetic fuel injection valve. (first embodiment)

I electromagnetic fuel injection valve
2 valve housing
3 valve seat member
4 magnetic cylindrical body
5 fixed core
6 non-magnetic cylindrical body
7 valve hole
12 movable core
14 valve body
26 fuel intake cylinder
28 coil assembly
30 coil
31 coil housing
31a first coil housing half body
31b second coil housing half body
32 covering layer (second covering layer)
34 coupler
44 barrel portion
45 front-end wall portion 46 rear-end wall portion
47 front connection cylindrical portion
47a thin portion
48 rear connection cylindrical portion
48a thin portion Mode for Carrying Out the Invention Descriptions will be hereinbelow provided for an embodiment of the present invention on the basis of a preferable example of the present invention which is shown in the attached drawings. It should be noted that: a direction toward a fuel-injection side of an electromagnetic fuel injection valve of the present invention is defined as frontward; and a direction toward a fuel-intake side of the electromagnetic fuel injection valve is defined as rearward.

Embodiment 1

In FIG. 1, a valve housing 2 of an electromagnetic fuel injection valve I for an engine includes: a cylinder-shaped valve seat member 3; a magnetic cylindrical body 4 fitted to and fluid-tightly welded to the rear-end part of the valve seat member 3; a non-magnetic cylindrical body 6 butted against and fluid-tightly welded to the rear end of the magnetic cylindrical body 4; a cylinder-shaped fixed core 5 whose front-end part is fitted in and fluid-tightly welded to the inner peripheral surface of the non-magnetic cylindrical body 6; and a fuel intake cylinder 26 integrally connected to the rear end of the fixed core 5 with the same material used for the fixed core 5. The valve housing 2 is formed in a way that makes the outer peripheral surfaces of the respective components have the same diameter, except for a rear-end small-diameter portion 26a of the fuel intake cylinder 26.

The valve seat member 3 includes: a valve hole 7 opened in the front-end surface of the valve seat member 3; a cone-shaped valve seat 8 continuing to an inner end of the valve hole 7; and a cylinder-shaped guide hole 9 continuing to a large-diameter part of the valve seat 8. A steel-made injector plate 10 having multiple fuel injection holes 11, which communicate with the valve hole 7, is fluid-tightly welded to the front-end surface of the valve seat member 3.

A part of the non-magnetic cylinder body 6, which is not fitted to the fixed core 5, is left in the front-end part of the non-magnetic cylindrical body 6. A valve assembly V is housed in the housing 2 from the part to the valve seat member 3.

The valve assembly V includes: a globular valve body 14 capable of bringing the guide hole 9 into the sliding movement so as to open and close the valve hole 7 in cooperation with the valve seat 8; and a movable core 12 integrally including a lever portion 13 which is connected to the valve body 14 by welding. The movable core 12 includes an annular journal portion 12a which is slidably supported by the inner peripheral surface of the magnetic cylindrical body 4, and is placed opposite to the fixed core 5. Multiple flat surfaces which allow the passage of fuel is formed in the periphery of the globular valve body 14.

The valve assembly V is provided with: a longitudinal hole 19 which starts at the rear-end surface of the movable core 12 and ends at an intermediate part of the lever portion 13; and a traverse hole 20 which makes the longitudinal hole 19 open in the outer peripheral surface of the lever portion 13. An annular spring seat 24 facing toward the fixed core 5 is formed in a halfway part of the longitudinal hole 19.

The fixed core 5 includes a longitudinal hole 21 which makes a hollow part of the fuel intake cylinder 26 communicate with the front-end surface of the fixed core 5. The diameter of the longitudinal hole 21 is smaller than that of the hollow part of the fuel intake cylinder 26, and communicates with the longitudinal hole 19 of the movable core 12.

A slotted pipe-shaped retainer 23 is press-fitted in the longitudinal hole 21 of the fixed core 5. A valve spring 22 for urging the movable core 12 toward the side on which the valve body 14 is closed is compressedly installed between the retainer 23 and the spring seat 24. In this process, the set load of the valve spring 22 is adjusted by the depth to which the retainer 23 is fitted into the longitudinal hole 21.

A ring-shaped stopper member 37 made of a non-magnetic material is embedded in the movable core 12. The stopper member 37 slightly protrudes from the rear-end surface of the moveable core 12 that faces the fixed core 5. The stopper member 37 is configured to leave a predetermined gap between the opposed end surfaces of the respective fixed and movable cores 5, 12 when the stopper member 37 comes in contact with the front-end surface of the fixed core 5 during the attraction of the fixed and movable cores 5, 12 to each other.

Corresponding to the fixed core 5 and the movable core 12, a coil assembly 28 is fittingly set on the outer periphery of the valve housing 2. The coil assembly 28 includes a bobbin 29 and a coil 30 wound therearound, the bobbin 29 being fitted onto outer peripheral faces from the rear-end part of the magnetic cylindrical body 4 to the fixed core 5. A base end part of a coupler terminal 33 projecting toward one side is held by the rear-end part of the bobbin 29, and the terminal of the coil 30 is connected to the coupler terminal 33. A first covering layer 27, made of synthetic resin, for covering the outer periphery of the coil 30 so as to embed and seal the coil 30 is molded around the coil assembly 28. During this process, a coupler 34 projecting toward one side of the coil assembly 28 with the coupler terminal 33 housed and held in the coupler 34 is formed integrally with the first covering layer 27.

Both the front-end and rear-end parts of a magnetic coil housing 31 surrounding the coil assembly 28 are welded respectively to the outer peripheral surfaces of the magnetic cylindrical body 4 and the fixed core 5. Detailed descriptions for the coil housing 31 will be provided later.

Stretching from the rear half of the magnetic cylindrical body 4 to the front half part of the fuel intake cylinder 26, a second covering layer 32, made of synthetic resin, which the coil assembly 28, the coil housing 31 and the bottom of the coupler 34 are embedded in and sealed by, is formed by injection molding around the outer peripheral surfaces of the magnetic cylindrical body 4 and the fuel intake cylinder 26. During this process, a thick portion 32a to cover an annular stepped part leading to the small-diameter portion 26a of the fuel intake cylinder 26 is formed in the rear end of the second covering layer 32. An O-ring 51 is set on the outer peripheral surface of the fuel intake cylinder 26 between the thick portion 32a and an attachment flange 43a of a fuel filter 43 which is press-fitted in an inlet of the fuel intake cylinder 26. In addition, a seal member 52, which is in intimate contact with the front-end surface of the second covering layer 32, is fitted around the outer periphery of the magnetic cylindrical body 4.

Fuel, which is fed under pressure from a fuel pump (not illustrated) to the fuel intake cylinder 26, is filtered by the fuel filter 43, and thereafter fills the inside of the valve housing 2. While the coil 30 is de-energized, the valve assembly V is pressed frontward by the urging force of the valve spring 22, and accordingly makes the valve body 14 sit on the valve seat 8. Once the coil 30 is energized by the passage of current, the magnetic flux produced thereby sequentially runs the coil housing 31, the magnetic cylindrical body 4, the movable core 12 and the fixed core 5. Because of an attraction attributable to a magnetic force produced between the two cores 5, 12, the movable core 12 is attracted to the fixed core 5 against the set load of the valve spring 22, and the valve body 14 leaves the valve seat 8. For this reason, the valve hole 7 is opened, the high-pressure fuel inside the valve seat member 3 goes out through the valve hole 7, and is injected to an air intake passage of a throttle body (not illustrated) or an engine (not illustrated), to which the electromagnetic fuel injection valve I is attached, through the fuel injection holes 11 of the injector plate 10.

Descriptions will be provided for the coil housing 31 by referring to FIGS. 2 to 5.

The coil housing 31 includes first and second coil housing half bodies 31a, 31b whose respective cross sections are shaped like an inferior arc, and which are placed opposite to each other with the coil assembly 28 and the coupler 34 interposed between the first and second coil housing half bodies 31a, 31b. The coil housing half bodies 31a, 31b are press-formed from a magnetic sheet. Because their cross sections are shaped like an inferior arc, the coil housing half bodies 31a, 31b can easily be formed without deeply drawing during the press-forming process.

Each of the coil housing half bodies 31a, 31b includes a barrel portion 44, a front-end wall portion 45, a rear-end wall portion 46, a front connection cylindrical portion 47 and a rear connection cylindrical portion 48. The barrel portion 44 covers the outer peripheral surface of the coil assembly 28. The front-end and rear-end wall portions 45, 46 are bent inward in the radial direction from the respective opposite ends of the barrel portion 44, and are in contact with the respective front-end and rear-end surfaces of the bobbin 29. The front connection cylindrical portion 47 extends frontward from the inner end of the front-end wall portion 45, and is welded to the outer peripheral surface of the magnetic cylindrical body 4. The rear connection cylindrical portion 48 extends rearward from the inner end of the rear-end wall portion 46, and is welded to the outer peripheral surface of the fixed core 5. Moreover, the two coil housing half bodies 31a, 31b are formed symmetrically.

Furthermore, the inner peripheral surface of the front connection cylindrical portion and the inner peripheral surface of the rear connection cylindrical portion 48 are formed with the same diameter in conjunction with the outer peripheral surfaces of the magnetic cylindrical body 4 the fixed core 5 having the same diameter. Thus, front and rear half parts of each of the coil housing half bodies 31a, 31b in their axial directions are formed symmetrically.

Thin portions 47a, 48a are formed, respectively, in the tip of the front connection cylindrical portion and the tip of the rear connection cylindrical portion 48 at the same time as the coil housing half bodies 31a, 31b are press-formed. During the press forming process, parts of each of the coil housing half bodies 31a, 31b, except for the thin portions 47a, 48a, are formed with the same thickness. Thus, in each of the coil housing half bodies 31a, 31b, the magnetic circuit portion between the front connection cylindrical portion 47 and the rear connection cylindrical portion 48 is formed with the same thickness. Thereby, both the weight reduction requirement and the magnetic efficiency requirement can be satisfied in each of the coil housing half bodies 31a, 31b. On the other hand, the angle θ of the inferior arc needs to be 130° to 140° in order for the front and rear connection cylindrical portions, which have the smallest areas of the magnetic paths in the respective first and second coil housing half bodies 31a, 31b, to obtain a predetermined magnetic characteristic. While satisfying the requirement for the angle θ of the inferior arc, between the coil housing half bodies 31a, 31b, a space Si on a side where the bottom of the coupler 34 is interposed is provided, and a space S2 on a side opposite thereto is also provided.

The welding of the front and rear connection cylindrical portions to the valve housing 2 is achieved by applying laser welding to at least three parts of the thin portions 47a, 48a which include the opposite end parts and an intermediate part of each connection cylindrical portion in the circumferential direction. Reference numerals W1, W2 denote parts to which the laser welding is applied. The laser welding of the thin portions 47a, 48a to the valve housing 2 makes it possible for the coil housing half bodies 31a, 31b to be laser-welded to the valve housing 2 with a relative small amount of heat input. Particularly, the thin portion 47a of the front connection cylindrical portion 47 is laser-welded to the parts of the magnetic cylindrical body 4 which deviate frontward from a part of the magnetic cylindrical body 4 which slidably supports the journal portion 12a of the movable core 12. This prevents the part of the magnetic cylindrical body 4 that supports the journal portion 12a, from thermally deforming due to the laser-welding of the thin portion 47a, and accordingly makes it possible to secure the smooth operation of the movable core 12.

In this respect, R1 and R2 is set to be R1≥R2, where R1 denotes the radius of the outer peripheral surface of the fixed core 5 and the magnetic cylindrical body 4, as well as R2 denotes the radius of the inner peripheral surface of the front and rear connection cylindrical portions. The setting makes it possible to make the opposite end parts of each of the front and rear connection cylindrical portions in the circumferential direction securely in intimate contact with the outer peripheral surface of the valve housing 2. Particularly, a part of the front connection cylindrical portion which is in intimate contact with the magnetic cylindrical body 4 is placed opposite to the part of the magnetic cylindrical boy 4 which slidably support the journal portion 12a of the movable core 12. This can minimize the magnetic resistance between the movable core 12 and each front connection cylindrical portion.

In addition, the inner peripheral surface of the front connection cylindrical portion 47, except for the thin portion 47a, is placed in a position which is opposed to the journal portion 12a of the movable core 12 which is slidably in intimate contact with the inner peripheral surface of the magnetic cylindrical body 4 for the purpose of minimizing the magnetic resistance between the movable core 12 and the front connection cylindrical portion.

Figure 6:
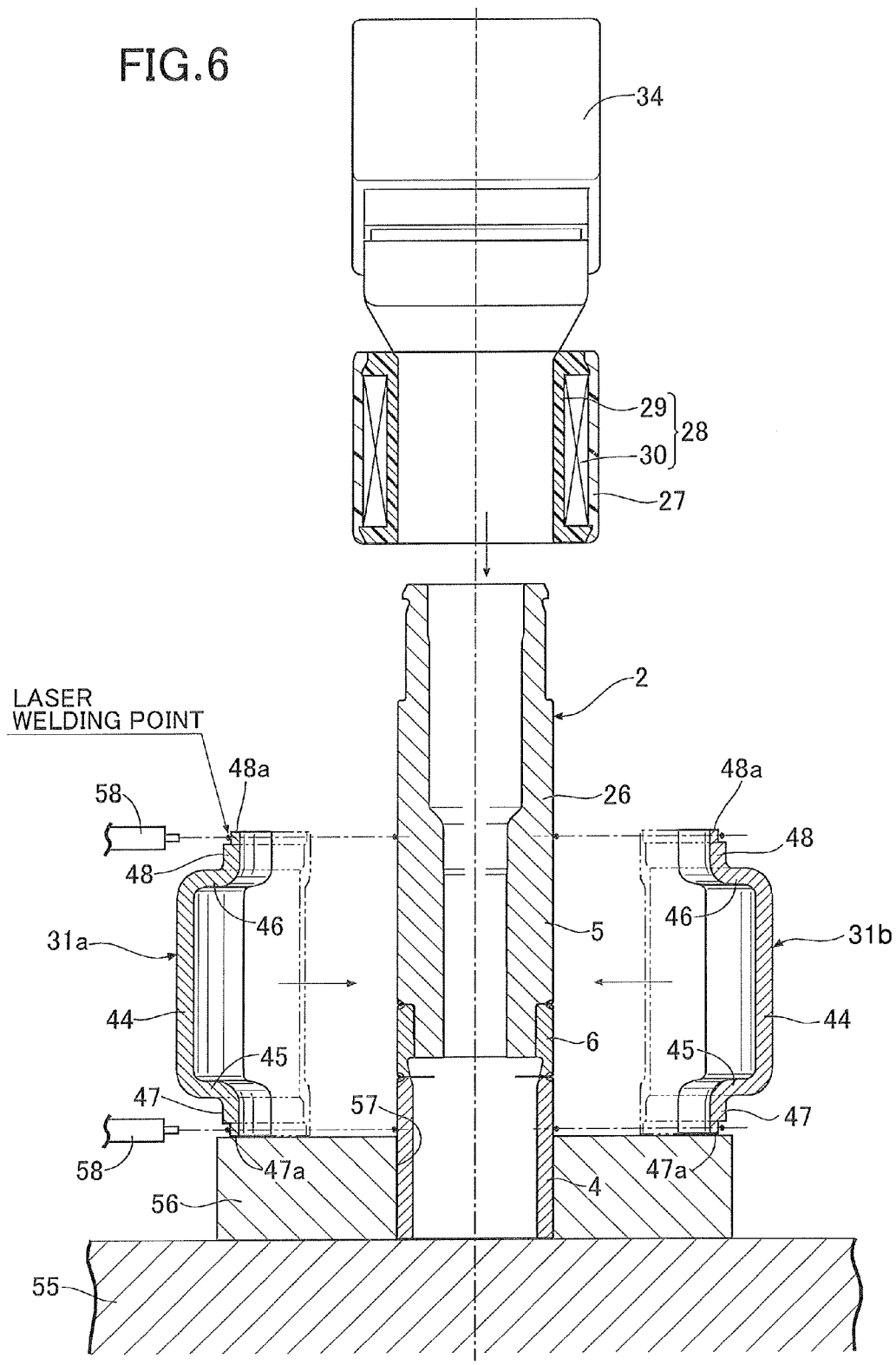
FIG. 6 is a view for explaining a step of mounting the coil housing to a valve housing. (first embodiment)

The electromagnetic fuel injection valve I is assembled as follows. First of all, as shown in FIG. 6, the valve housing 2 is produced by coaxially welding the magnetic cylindrical body 4, the non-magnetic cylindrical body 6, and the fixed core 5 integrated with the fuel intake cylinder 26 (with no valve seat member 3 attached yet). The valve housing 2 is inserted into a support hole 57 of a positioning jig 56 on an assembly table 55 with the magnetic cylindrical body 4 down, and is set upright. Subsequently, the coil assembly 28 with the coupler 34 is fitted to the outer periphery of the valve housing 2, and in addition, the first and second coil housing half bodies 31a, 31b are put closer to each other from the left and right in a way that makes the coil assembly 28 and the bottom of the coupler 34 interposed between the first and second coil housing half bodies 31a, 31b from the left and right, and in a way that makes the coil assembly 28 wrapped with the first and second coil housing half bodies 31a, 31b. With the coil assembly 28 contained inside the barrel portion 44 while the front connection cylindrical portions 47 of the respective two coil housing half bodied 31a, 31b are placed on the top surface of the positioning jig 56, the front connection cylindrical portion is brought into intimate contact with the outer peripheral surface of the magnetic cylindrical body 4, and the rear connection cylindrical body is brought into intimate contact with the outer peripheral surface of the fixed core 5. Thereafter, the three predetermined parts of each of the thin portions 47a and 48a of the front and rear connection cylindrical portions 47 and 48 are laser-welded to the valve housing 2 by use of a laser torch 58. Thereby, the coil housing 31 is attached to the valve housing 2.

The positioning jig 56 is designed to make the inner peripheral surface of the main part, except for the thin portion 47a, of each front connection cylindrical portion 47 located in the parts of the magnetic cylindrical body 4 which support the journal portion 12a. For this reason, each front connection cylindrical portion 47 can be securely welded to the outer peripheral surface of the magnetic cylindrical body 4 in a position which minimize the magnetic resistance between the magnetic cylindrical body 4 and the front connection cylindrical portion 47. Furthermore, the position of the coil assembly 28 in the axial direction is determined by being interposed between the front-end wall portion 45 and the rear-end wall portion 46 of each of the coil housing half bodies 31a, 31b.

Moreover, the first and second coil housing half bodies 31a, 31b forming the coil housing 31 are formed symmetrically, while the front half part and real half part of each of the coil housing half bodies 31a, 31b are formed symmetrically. For this reason, the two coil housing half bodies 31a, 31b can be formed from identical compartments interchangeable with each other. This not only contributes to cost reduction, but also enables each of the positions of the coil housing half bodies 31a, 31b in their fore-and-aft directions to be replaced. Accordingly, the two identical coil housing half bodies 31a, 31b can be placed in the appropriate locations by simply being put opposite to each other without considering the fore-and-aft directions of the coil housing half bodies. This clears worry of the false assembly, and thus enhances the assembling efficiency.

After the attachment of the coil housing 31, the manufacturing process proceeds to a step of forming the second covering layer 32. The second covering layer 32 is formed by the injection molding of the synthetic resin so as to embed and seal the coil assembly 28, the coil housing 31 and the bottom of the coupler 34. During this process, the injected resin easily enters the interstice between each of the coil housing half bodies 31a, 31b and the coil assembly 28 through the two spaces S1, S2, because between the first and second coil housing half bodies 31a, 31b, the space S1 is provided on a side where the bottom of the coupler 34 is interposed and the space S2 is also provided on a side opposite thereto. This makes it possible to securely embed, seal and fix the coil assembly 28, and concurrently to secure the insulation quality and waterproofness for the coil assembly 28.

After the formation of the second covering layer 32, the valve assembly V is installed in the magnetic cylindrical body 4, and the valve seat member 3 is fitted into, and welded to, the front-end part of the magnetic cylindrical body 4. Subsequently, the valve spring 22 and the retainer 23 are installed in the valve housing 2 from the fuel intake cylinder 26. Thereafter, the fuel filter 43, the O-ring 51 and the seal member 52 are attached to the valve housing 2. With this, the assembling of the electromagnetic fuel injection valve I is completed.

An embodiment of the present invention is explained above, but the present invention is not limited to the above-mentioned embodiment and may be modified in a variety of ways as long as the modifications do not depart from the spirit and scope thereof.

The invention claimed is:

1. An electromagnetic fuel injection valve including: a valve housing including a valve seat member with a valve hole in its front end, a magnetic cylindrical body, a non-magnetic cylindrical body, a fixed core and a fuel intake cylinder which are sequentially connected from a front end toward a rear end thereof, an inside of the valve housing serving as a fuel passage; a coil assembly which includes a bobbin and a coil wound therearound and is placed from the fixed core to the non-magnetic cylindrical body on outer peripheries thereof; a coil housing whose opposite end parts are connected to outer peripheral surfaces, respectively, of the fixed core and the magnetic cylindrical body with the coil assembly housed in the coil housing, the coil housing forming a magnetic circuit between the fixed core and the magnetic cylindrical body when the coil assembly is electrified; a valve body for opening and closing the valve hole in cooperation with the valve seat member; a movable core which is connected to the valve body, slidably fitted to an inner peripheral surface of the magnetic cylindrical body, and opens the valve body due to its attraction to the fixed core when the magnetic circuit is formed; and a coupler which is connected to the coil assembly, projects outward of the coil housing, and is formed integrally with a first covering layer, made of synthetic resin, for covering an outer periphery of the coil to embed and seal the coil, wherein the coil housing includes first and second coil housing half bodies whose cross sections are each shaped like an inferior arc, and which are placed oppositely disposed so as to interpose the coil assembly and the coupler, each of the coil housing half bodies includes: a barrel portion for covering an outer peripheral surface of the coil assembly; a front-end wall portion and a rear-end wall portion which are bent inward in a radial direction from opposite ends of the barrel portion, and are in contact with front-end and rear-end surfaces of the coil assembly; a front connection cylindrical portion extending frontward from an inner end of the front-end wall portion, and fixedly attached to the outer peripheral surface of the magnetic cylindrical body; and a rear connection cylindrical portion extending rearward from an inner end of the rear-end wall portion, and fixedly attached to the outer peripheral surface of the fixed core, the first and second coil housing half bodies are formed symmetrically and outer diameters of the magnetic cylindrical body and the fixed core are set equal to each other, so that one half and the other half part of each of the coil housing half bodies in an axial direction are formed symmetrically, and, between the first and second coil housing half bodies, a first space (S1) is provided on a side where a bottom of the coupler is interposed, a second space (S2) is also provided on a side opposite thereto, the relationship between the first space (S1) and the second space (S2) is set to be S1>S2, and a second covering layer, made of synthetic resin, which the coil assembly and the bottom of the coupler are embedded in and sealed by, is molded around an outer periphery of the valve housing.

2. The electromagnetic fuel injection valve according to claim 1, wherein the coil housing half bodies are made by pressing, and the magnetic circuit part between the front connection cylindrical portion and the rear connection cylindrical portion is formed with the same thickness.

3. The electromagnetic fuel injection valve according to claim 1, wherein a radius of an inner peripheral surface of the front and rear connection cylindrical portions of each of the coil housing half bodies is set equal to a radius of each of the outer peripheral surfaces of the magnetic cylindrical body and the fixed core, so that opposite end parts of each of the connection cylindrical portions in a circumferential direction are put in intimate contact with the outer peripheral surfaces of the magnetic cylindrical body and the fixed core, and parts of the front connection cylindrical portion and the magnetic cylindrical body which are in intimate contact with each other are placed opposite to a part of the magnetic cylindrical body which slidably supports the movable core.

4. The electromagnetic fuel injection valve according to claim 1, wherein thin portions whose thicknesses are less than those of the remaining portions of the coil housing half bodies are formed in outer ends of the front connection cylindrical portion and the rear connection cylindrical portion, respectively, the thin portion of the front connection cylindrical portion is laser-welded to of the outer peripheral surface of the magnetic cylindrical body, at a part deviating forward from a part of the magnetic cylindrical body which slidably supports the movable core, and the thin portion of the rear connection cylindrical portion is laser-welded to the outer peripheral surface of the fixed core.

5. The electromagnetic fuel injection valve according to claim 1, wherein the first and second coil housing half bodies are identical.

6. The electromagnetic fuel injection valve according to claim 1, wherein the synthetic resin of which the second covering layer is made is also disposed in the first and second spaces.

* * * * *